Jan. 7, 1936. G. B. WATKINS 2,026,717
LAMINATED GLASS
Original Filed April 30, 1928
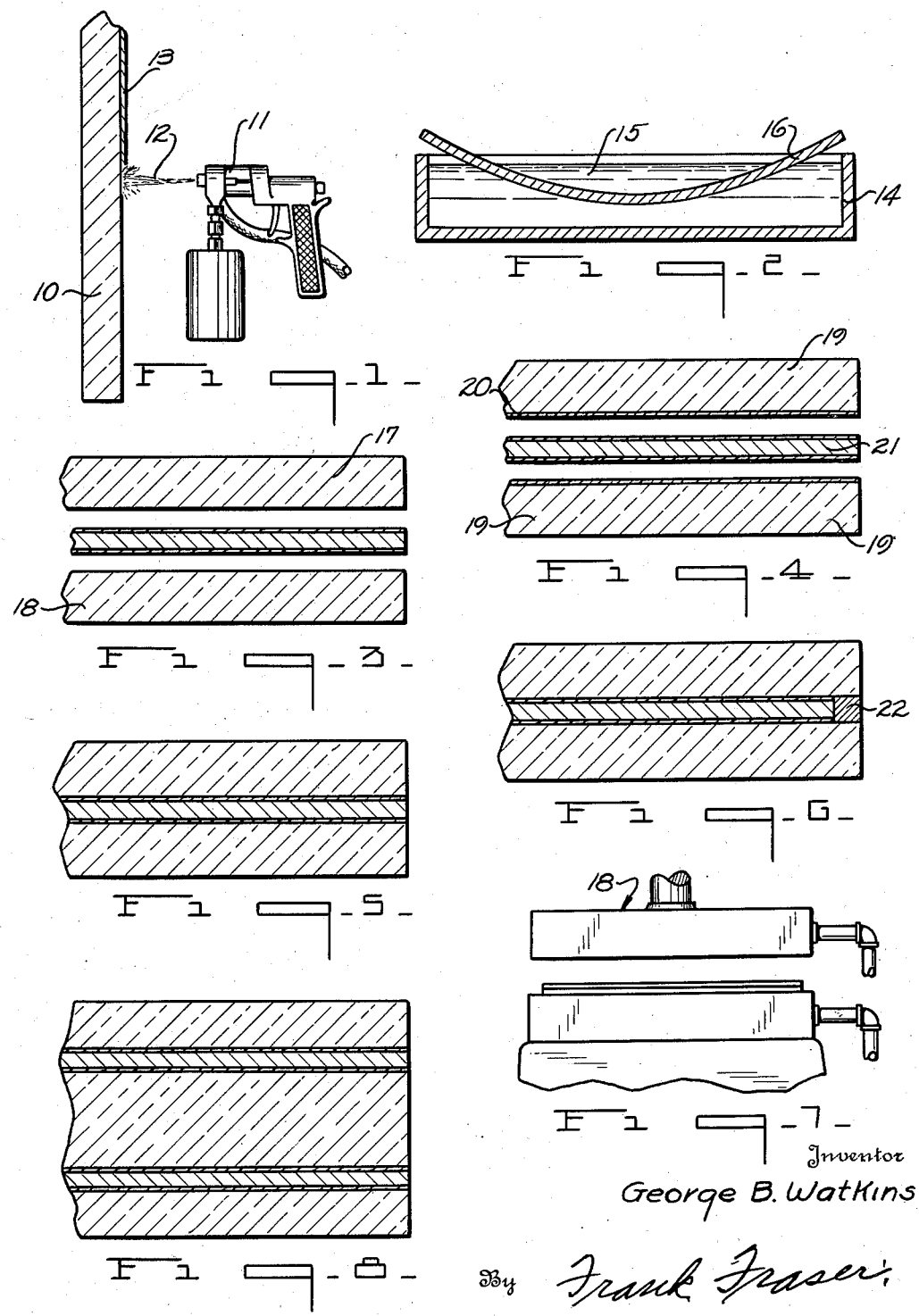
Inventor
George B. Watkins
By Frank Fraser
Attorney Patented Jan. 7, 1936

2,026,717

UNITED STATES PATENT OFFICE 2,026,717

LAMINATED GLASS

George B. Watkins, Toledo, Ohio, assignor to Libbey-Owens-Ford Glass Company, Toledo, Ohio, a corporation of Ohio Application April 30, 1928, Serial No. 273,781
Renewed November 6, 1933

2 Claims. (Cl. 49—81)

The present invention relates to laminated glass.

An important object of the invention is to provide a process for producing laminated glass wherein two or more thermo-plasticizers, having preferably high boiling point, low vapor pressures, are combined to produce a binding liquid adapted for use in the joining of two or more laminations.

Another object of the invention is to provide such a process wherein two or more laminations are bonded together by the aid of a binding liquid produced by mixing two or more thermo-plasticizers, the resultant mixture preferably being such that it can be applied to the laminations and allowed to remain thereon for a relatively long time before the laminations are pressed together, without causing injury.

Other objects and advantages of the invention will become more apparent during the course of the following description when taken in connection with the accompanying drawing.

In the drawing wherein like numerals are employed to designate like parts throughout the same, Fig. 1 is a diagrammatic view illustrating the formation of a skin on a sheet of glass, Fig. 2 illustrates diagrammatically the application of my improved binding liquid to a non-brittle sheet, Fig. 3 is a fragmentary sectional view showing the laminations before they are united, Fig. 4 is a view similar to Fig. 3, except that a skin is used on the glass sheets, Fig. 5 is a fragmentary sectional view of a form of finished sheet, Fig. 6 is the same as Fig. 5, except that it shows the use of a seal, Fig. 7 is a diagrammatic representation of a press that may be used, and Fig. 8 is a fragmentary sectional view of a sheet of so-called "bullet-proof" glass.

In Fig. 1, the numeral 10 designates a sheet of preferably transparent glass whose surfaces may be ground and polished, or not, as desired. In some forms of laminated glass it is desirable to form a skin on the laminations, and as shown in Fig. 1, a spray gun or the like 11 is used to spray or otherwise apply a solution 12 on a surface of the glass sheet, which solution forms a deposit 13 thereon. The solution 12 may be any preferred composition dissolved in a suitable solvent such as for instance a cellulose composition material. After the coating 13 has been formed on the sheet, it is usually dried to form a skin from which most of the solvents have been removed.

As is generally known, laminated glass comprises two or more sheets of glass and one or more sheets of non-brittle material such as a cellulose ester sheet. The cellulose ester sheet is interposed in the sandwich between the glass sheets, and it is the non-brittle sheet which gives the non-shatterable qualities to the composite sheet produced from the sandwich, that is, provided the glass sheets are properly joined to the non-brittle sheet.

The present invention relates particularly to the liquid or medium used to obtain the bond between the non-brittle sheet and the glass sheets. The term "binding liquid" is used therefore to designate this liquid.

In Fig. 2, the numeral 14 designates a receptacle in which is contained a bath of my improved binding liquid 15. The non-brittle sheet 16 is shown as being passed through the liquid in a manner as to become coated therewith. Obviously, the binding liquid 15 can be applied in many other ways than that of being dipped, and this invention contemplates any and all ways of applying the binding liquid to the non-brittle sheet, glass sheets, or all of the sheets.

To produce the binding liquid, I make a mixture of two or more thermo-plasticizers, each preferably having a high boiling point, low vapor pressure. I have found that some types of liquids have a noticeable solvent action on a cellulose ester sheet at room temperatures, and in such cases it is essential to join or press the sheets together promptly after such active solvents have been applied. If the pressing together at the laminations is not accomplished soon after the application of the active solvent, the celluloid has a tendency to "flow" which is objectionable.

I have also found that by the combination of two or more thermo-plasticizers, a mixture can be produced capable of being used in the manufacture of excellent laminated or composite glass. As an example of a mixture that I have used, I mention that diamyl phthalate and dibutyl phthalate, when mixed together, give a binding liquid of excellent qualities. Although a fifty-fifty mixture of these two works very satisfactorily, any other amounts or per cents can be used, and also the addition of a third thermo-plasticizer, or even more than three liquids can be mixed. For instance, diethyl phthalate can be added to the mixture above named, and an excellent binding liquid produced.

In a mixture formed from an equal percentage of diamyl phthalate and dibutyl phthalate, for instance, the mixture can be left on a cellulose ester sheet for ten minutes or more without seriously affecting the sheet. I consider this to be an important factor in the production of laminated glass where a multi-opening press is used. By a multi-opening press is meant a press where a number of sandwiches may be pressed simultaneously to produce a plurality of finished composite sheets. If a liquid is used that is particularly active at room temperatures, the first sandwich may become affected adversely, while the remaining sandwiches are being formed and placed in the press.

I, therefore, mix together thermo-plasticizers that will give a resultant mixture relatively inactive at room temperatures, and also thermo-plasticizers that have relatively high boiling point, low vapor pressures. By using such liquids in the mixture the finished sheet will not be affected adversely when subjected to summer's heat, etc., when the composite sheet is placed in actual use.

The solvents herein contemplated as the bond inducing medium are of that stable character in the laminated sheet when the latter is in normal use that any decomposition of the bond inducing medium or the expected or natural decomposition of the cellulose ester plastic incident to the lapse of time and heat and light energy will not be materially accelerated. The solvents possess sufficiently low vapor pressure as to minimize the tendency toward bubbling within the sheet due to a change of state of the bond inducing medium by passing from the liquid to the vapor phase when properly used.

Solvents may be employed within the spirit of the invention as long as the mixture possesses the desirable characteristics of stability, high boiling point, and low vapor pressure. Esters of phthalic acid, for example, have been found to satisfactorily embody the above characteristics. It is obvious that certain solvents, having the characteristics above specified, in carrying out the principle of the invention may vary from one another in degrees of high boiling points and low vapor pressures, etc. By way of illustration, in the practice of the invention as herein set forth, the boiling points of the solvents should preferably be above 350° F. and should preferably not exceed one-half the vapor pressure of camphor at ordinary temperatures. Assuming the vapor pressure of camphor to be .4 mm. of mercury at 68° F. or ordinary temperature, the vapor pressure should preferably not exceed .2 mm. of mercury at 68° F.

It has been demonstrated that solvents having the characteristics before mentioned and having a boiling point not lower and a vapor pressure not exceeding that specified have produced satisfactory results.

After the non-brittle sheet 16 has been coated with the binding liquid 15, the sheet may be interposed between the glass sheets 17 in Fig. 3 to form a sandwich. The sandwich may then be placed in a press designated in its entirety by the numeral 18 in Fig. 7, and is subjected to the combined action of heat and pressure. It is preferred that the pressing action be so controlled that all excess binding liquid be expelled during the pressing operation. The type of press illustrated is a single-opening press, but it is to be understood that my improved sheet can be formed from a multi-opening press, or in any other manner.

In Fig. 4, the glass sheets 19 are each provided with a skin coating 20, while the liquid covered non-brittle sheet 21 is interposed between the skin coated surfaces of the glass sheets. The binding liquid may also be applied to the surfaces of the glass sheets in Fig. 3 or the skins 20 on the sheets 19 in Fig. 4, as well as on the non-brittle membrane.

Fig. 5 shows diagrammatically the sheet formed from the laminations shown in Fig. 3. In some instances it is desirable to protect the bond between the laminations, and therefore a seal 22 may be used as shown in Fig. 6.

In Fig. 8 a different type of product is shown, which comprises three sheets of glass and two sheets of non-brittle material, all bonded together by the aid of my improved binding liquid.

It is to be understood that the form of the invention herewith shown and described is to be taken as the preferred embodiment of the same and that various changes in the shape, size and arrangement of parts may be resorted to without departing from the spirit of the invention or the scope of the subjoined claims.

I claim:

1. As a new article of manufacture, a sheet of laminated glass consisting of two sheets of glass and an interposed non-brittle membrane treated with a mixture of esters of phthalic acid.

2. As a new article of manufacture, a sheet of laminated glass consisting of two sheets of glass and an interposed non-brittle membrane treated with a mixture of diamyl phthalate and dibutyl phthalate.

GEORGE B. WATKINS.